UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

1,395,905.      Specification of Letters Patent.      Patented Nov. 1, 1921.

No Drawing.      Application filed February 16, 1921. Serial No. 445,418.

*To all whom it may concern:*

Be it known that I, HANS T. CLARKE, a subject of the King of Great Britain, residing at Rochester, in the county of Monroe and State of New York, have invented certain new and useful Improvements in Cellulose-Ether Compositions, of which the following is a full, clear, and exact specification.

This invention relates to a cellulose ether composition containing ingredients which enable it to be suitably manipulated and utilized in the plastic and analogous arts, such, for example, as sheet or film manufacture and varnish manufacture.

One object of this invention is to produce a composition which may be made into permanently, transparent, strong and flexible sheets of suitable thinness that are substantially waterproof, are unaffected by ordinary photographic fluids, and in general possess the desirable properties of a support for sensitive photographic coatings. Other objects will hereinafter appear.

I have discovered that such a composition can be prepared by compounding cellulose ethers of the type indicated in U. S. Patent No. 1,188,376, Lilienfeld, June 20, 1916, with salicylates of the higher aliphatic alcohols, such as normal butyl salicylate, amyl salicylate and isobutyl salicylate. The ingredients are combined by the use of a common solvent.

In carrying out one illustration of my invention, I use a suitable cellulose ether, preferably ethyl cellulose of the kind that is substantially insoluble in water and does not shrink to an undesirable amount in the photographic manipulations. To 100 parts of such ethyl cellulose I add 300 to 800 (say 500) parts of a mixture of benzol and ethyl alcohol, or any equivalent volatile solvent, and also add 1 to 100 (say 30) parts of normal butyl salicylate. The ingredients are thoroughly mixed into a homogeneous composition. The substances are of commercial grades, having sufficient purity to provide the necessary transparency and comparative freedom from color in the finished articles, such as photographic film base.

The solutions may be varied considerably in the proportions that are employed and in the equivalents that may be substituted, in order to change the viscosity for flowing under different conditions. The example given above illustrates one form of composition or dope that may be flowed properly under the usual film manufacturing conditions. When spread in the usual way, the volatile solvents evaporate sufficiently to leave a product suitable for any of the usual preferred purposes of this art. Normal butyl salicylate, which is mentioned in the example, has a boiling point of 155° C., at mm. pressure and consequently its boiling point under normal pressure is well above 230° C., indicating a very low volatility. Consequently, its stays in the film and imparts its characteristic properties to the latter. The equivalent salicylates of the other higher alcohols likewise have analogous properties.

Having thus described my invention, what I claim as new and desire to secure by Letters Patent is:

1. A composition of matter comprising a cellulose ether and a salicylic acid ester of a monohydroxy aliphatic alcohol having from 4 to 5 carbon atoms.

2. A composition of matter comprising ethyl cellulose and a salicylic acid ester of a monohydroxy aliphatic alcohol having from 4 to 5 carbon atoms.

3. A composition of matter comprising ethyl cellulose and normal butyl salicylate.

4. A flowable film-forming composition of matter comprising a cellulose ether, a salicylic acid ester of a monohydroxy aliphatic alcohol having from 4 to 5 carbon atoms and a solvent common to both.

5. A composition of matter comprising ethyl cellulose, normal butyl salicylate and a common solvent.

6. A composition of matter comprising ethyl cellulose, normal butyl salicylate, benzol and ethyl alcohol.

7. A composition of matter comprising 100 parts of ethyl cellulose, 300 to 800 parts of a compound benzol and ethyl alcohol solvent and 1 to 100 parts of a salicylic acid ester of a monohydroxy aliphatic alcohol having from 4 to 5 carbon atoms.

8. As an article of manufacture, a sheet of deposited or flowed cellulose ether containing a salicylic acid ester of a monohydroxy aliphatic alcohol having from 4 to 5 carbon atoms.

9. As an article of manufacture, a sheet of deposited or flowed ethyl cellulose containing normal butyl salicylate.

Signed at Rochester, New York, this 9th day of February, 1921.

HANS T. CLARKE.